G. M. EATON.
FLEXIBLE GEAR WHEEL.
APPLICATION FILED MAR. 1, 1917.
1,284,268.
Patented Nov. 12, 1918.
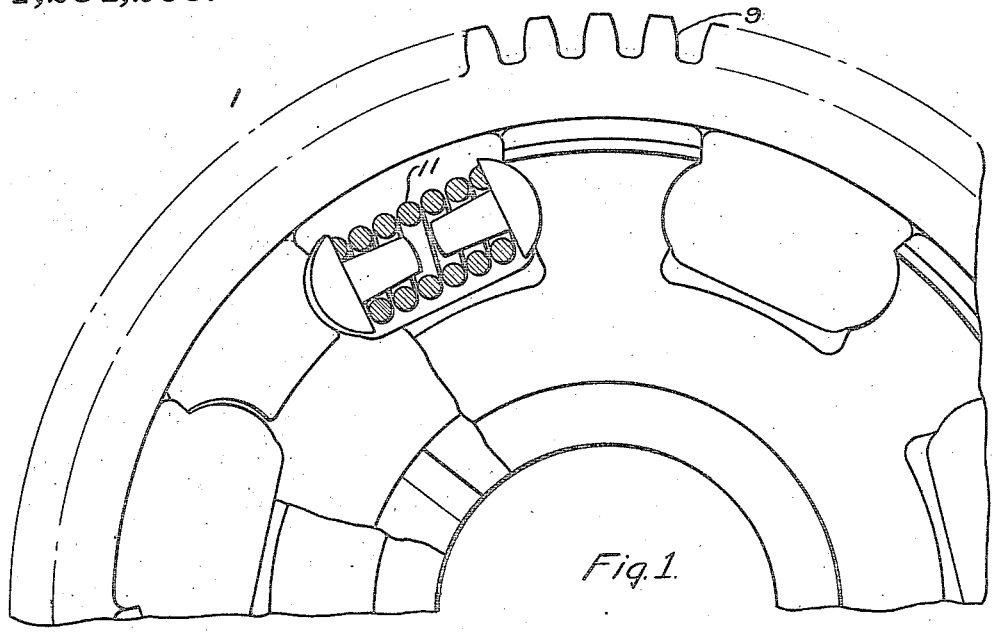
Fig. 1.
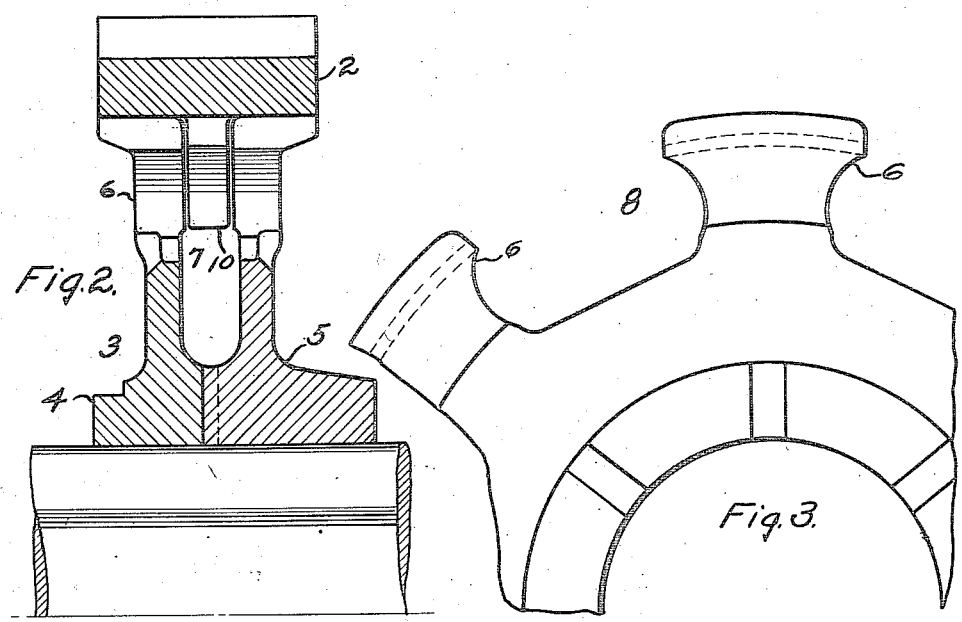
Fig. 2.
Fig. 3.
WITNESSES:
William Siler.
W. B. Wells.
INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

FLEXIBLE GEAR-WHEEL.

1,284,268.

Specification of Letters Patent.

Patented Nov. 12, 1918.

Application filed March 1, 1917. Serial No. 151,648.

*To all whom it may concern:*

Be it known that I, GEORGE M. EATON, a citizen of the United States, and a resident of Pittsburgh, in the county of Allegheny and State of Pennsylvania, have invented a new and useful Improvement in Flexible Gear-Wheels, of which the following is a specification.

My invention relates to gear wheels and particularly to flexible gear wheels for service in electrical vehicles.

One object of my invention is to provide a gear wheel which shall be simple, rugged and inexpensive in construction and reliable and effective in operation.

Another object of my invention is to provide a gear wheel of the above indicated character which shall be provided with a rim section, a hub section embodying one more member than said rim section, and resilient connectors for joining said sections.

Another object of my invention is to provide a flexible gear wheel of the above indicated character which shall embody a hub section composed of a plurality of members which are disposed in side-by-side relation to each other and are provided with means for preventing relative rotation therebetween.

Heretofore, flexible gear wheels of the type under consideration have been constructed with integral sections which were formed by a rolling or casting operation and at a considerable expense, by reason of the difficulty encountered in forming a groove between and the pockets adjacent to the various hub projections. In case the hub section of the gear wheel is formed by a casting operation, it is impracticable to core the groove for receiving the rim projections, as the burned sand that is left on the cored surfaces is so destructive to tools as to make it cheaper to machine the groove from a solid gear section. When the hub section is rolled in one piece, it is impracticable to form pockets and a groove in the periphery of the hub section during the rolling operation.

However, in a gear wheel constructed in accordance with my invention, the hub section is composed of a number of members which are separately rolled and then disposed in side-by-side relation to form a composite hub section which will require little machining to complete the same for assembling with the rim section.

In the accompanying drawing, Figure 1 is a partial side elevational view of a gear wheel constructed in accordance with my invention; Fig. 2 is a sectional view of the gear wheel illustrated in Fig. 1, and Fig. 3 is a partial side elevational view of one of the hub members.

Referring to the accompanying drawing, a gear wheel 1 is composed of a rim section 2 and a hub section 3 which comprises two members 4 and 5. Each of the hub members 4 and 5 is provided with a plurality of radial projections 6, which are so disposed in the assembled gear wheel as to register in pairs and form a groove 7 therebetween and pockets 8 adjacent thereto.

The rim section 2 is annular in form and is provided with gear teeth 9 which are formed on the periphery thereof and with radial projections 10 which register with the hub projections 6. In the pockets adjacent to the hub and rim members are disposed connectors 11 consisting of helical springs and spring seats of a familiar and well-known type which are disclosed in my pending application Serial No. 76,601, filed February 7, 1916. The pockets extend through the gear so the springs and seats may be inserted or removed from either side.

The hub members 4 and 5 are splined together, as is illustrated in Figs. 2 and 3 of the drawing, to prevent relative rotation therebetween and, if desired, the two members may be bolted or connected together in any desired manner to prevent any lateral movement of one of the members relative to the other member. Preferably the two hub members 4 and 5 are separately formed by a rolling operation, but, if so desired, the same may be formed by a casting operation.

In case the two members 4 and 5 are formed separately by a rolling operation, it is readily perceived that the slot for the hub projections 10 may be formed without an extensive machining operation and that the pockets 8 between the projections 6 may be formed principally by a drilling operation.

Modifications in the structure and arrangement and location of parts may be made within the spirit and scope of my invention and such modifications are intended to be covered by the appended claims.

I claim as my invention:

1. In a flexible gear wheel, the combination with a hub section comprising a plurality of members having radial projections extending therefrom, of a rim section having a plurality of radial projections registering with and disposed between said hub projections, and resilient connectors for joining said projections, said connectors being removable and insertible from either side of the wheel without removing either hub member.

2. In a driving mechanism, the combination with a rim member having a plurality of radial projections, of a plurality of hub members upon which said rim member is mounted, said hub members being secured together side-by-side and each having a plurality of radial projections, the hub projections being oppositely-disposed and spaced apart laterally to receive between them the radial projections on the rim, the hub and rim radial projections being peripherally spaced so as to permit placing the projections on the rim between those on the hub members for assembling and disassembling the members, and means between adjacent groups of projections for operatively connecting the hub and rim members.

3. In a gear wheel, the combination of a rim member having inwardly-extending angularly-spaced projections, a plurality of hub members for supporting said rim member, said hub members being secured side-by-side and against relative rotation and provided with registering spaced radial projections at their peripheries, the projections constituting each pair of hub projections being spaced apart laterally to receive said rim projections between them, the peripheral spaces between the registering projections on the rim and hub members forming pockets, and devices in said pockets for operatively connecting the rim and hub members.

4. In a resilient gear wheel, the combination of a rim member having inwardly-extending angularly-spaced projections, a pair of hub members for supporting said rim member, said hub members being secured side-by-side and against relative rotation and having oppositely-disposed radial projections at their peripheries, each pair of hub projections being spaced apart laterally to receive said rim projections between them, pockets being formed between the groups of registering rim and hub projections, and resilient devices disposed in said pockets for operatively connecting the rim and hub members.

In testimony whereof, I have hereunto subscribed my name this 24th day of February, 1917.

GEORGE M. EATON.